United States Patent [19]
Roffman et al.

[11] Patent Number: 5,805,260
[45] Date of Patent: *Sep. 8, 1998

[54] COMBINED MULTIFOCAL TORIC LENS DESIGNS

[75] Inventors: Jeffrey H. Roffman; Timothy A. Clutterbuck, both of Jacksonville; Yulin X. Lewis, Ponte Vedra Beach, all of Fla.

[73] Assignee: Johnson & Johnson Vision Products, Inc., Jacksonville, Fla.

[ * ] Notice: The term of this patent shall not extend beyond the expiration date of Pat. Nos. 5,650,837 and 5,652,638.

[21] Appl. No.: 712,954

[22] Filed: Sep. 12, 1996

Related U.S. Application Data

[63] Continuation of Ser. No. 433,843, May 4, 1995, abandoned.

[51] Int. Cl.⁶ .............................. G02C 7/04; G02C 7/02; A61F 2/16
[52] U.S. Cl. ...................... 351/161; 351/160 H; 351/176; 623/6
[58] Field of Search ................................ 623/6; 351/161, 351/168, 169, 176, 160 H

[56] References Cited

U.S. PATENT DOCUMENTS

| | | | |
|---|---|---|---|
| 3,614,217 | 10/1971 | Bronstein | 351/161 |
| 4,580,882 | 4/1986 | Nuchman et al. | 351/161 |
| 4,704,016 | 11/1987 | De Carle | 351/161 |
| 5,089,024 | 2/1992 | Christie et al. | 351/161 |
| 5,125,729 | 6/1992 | Mercure | 351/161 |
| 5,366,502 | 11/1994 | Patel | 623/6 |
| 5,488,442 | 1/1996 | Harsigny et al. | 351/169 |
| 5,650,837 | 7/1997 | Roffman et al. | 351/161 |
| 5,652,638 | 7/1997 | Roffman et al. | 351/161 |

FOREIGN PATENT DOCUMENTS 207878  4/1984  New Zealand .

Primary Examiner—Gerogia Y. Epps
Assistant Examiner—Jordan M. Schwartz

[57] ABSTRACT

Combined multifocal toric lens designs are disclosed which combine a correction for astigmatism, either corneal or lenticular, with a correction for presbyopia. One of the front and back surfaces of the lens defines a toric surface for an astigmatic optical correction, and one of the front and back surfaces, which can be the same surface or the opposite surface, defines a multifocal surface for a presbyopic optical correction, to provide visual acuity for astigmatic presbyopes. Embodiments are disclosed wherein one surface of the lens design has a combined concentric annular ring, multifocal toric surface, and the other surface of the lens design has a spherical or aspherical surface. In other embodiments, one surface of the lens design has a toric surface for a toric correction, and the other surface of the lens design has a multifocal surface to provide a presbyopic correction, which may include concentric annular ring multifocal lens designs, or other presbyopic lens designs which contain more than one spherical or aspherical power such as aspheres, segments, progressive aspheres, diffractive, birefringent or other concentrics.

14 Claims, 3 Drawing Sheets

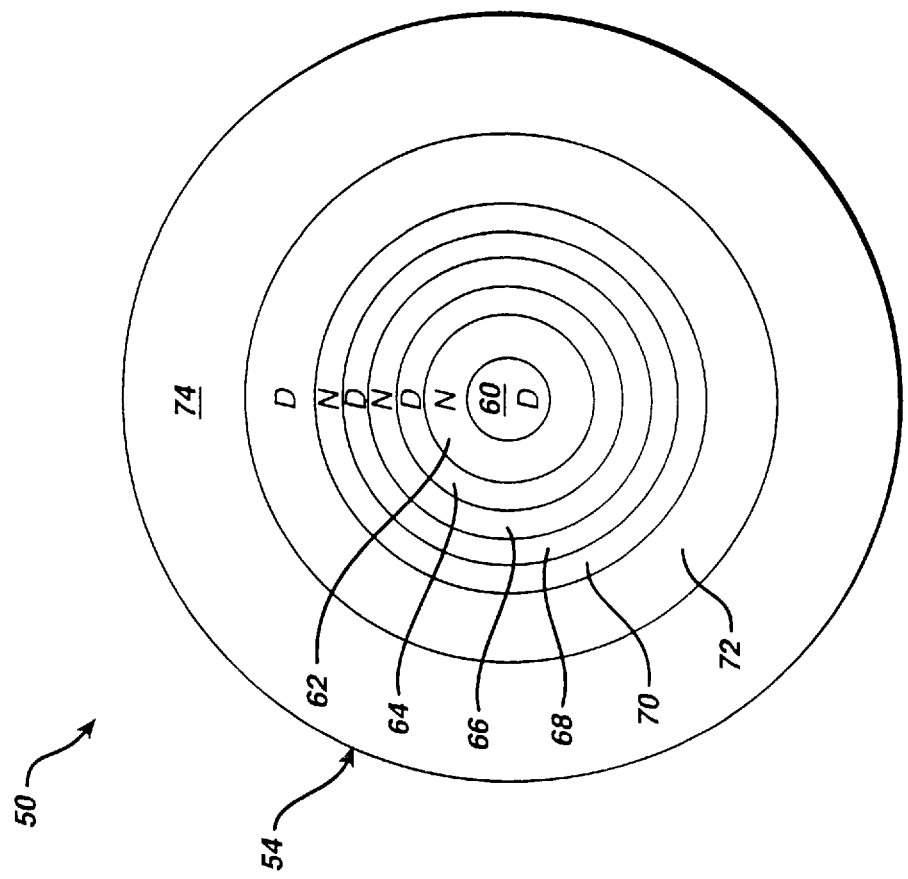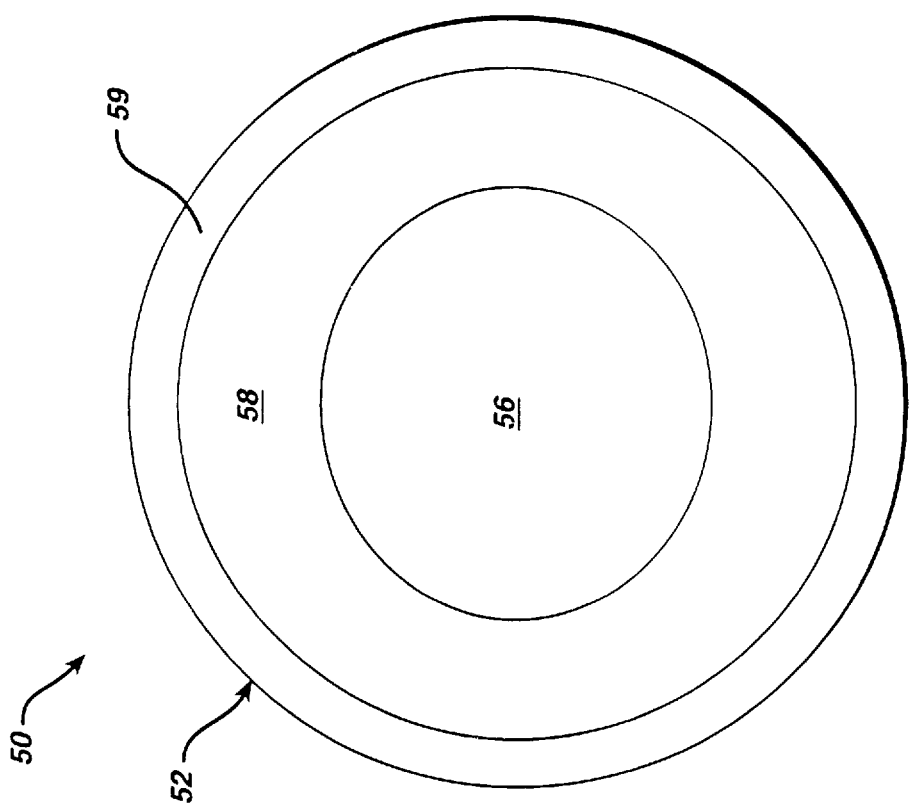

COMBINED MULTIFOCAL TORIC LENS DESIGNS

This is a continuation of application Ser. No. 08/433,843, filed May 4, 1995 now abandoned.

BACKGROUND OF THE INVENTION

1. Field of the Invention

The present invention relates generally to combined multifocal toric lens designs, and more particularly pertains to combined multifocal toric lens designs which combine a correction for astigmatism, either corneal or lenticular, with a correction for presbyopia.

In greater detail, the present invention provides a multifocus, concentric annular ring lens for astigmatic presbyopes wherein one of the front and back surfaces of the lens defines a toric surface for an astigmatic optical correction, and one of the front and back surfaces defines a multifocal surface for a presbyopic optical correction, to provide visual acuity for astigmatic presbyopes.

2. Discussion of the Prior Art

Conventional multifocal soft contact lenses and intraocular lenses provide both a distance and a near spherical optical power. However, many patients cannot achieve sufficient visual acuity due to corneal or lenticular astigmatism.

The present invention pertains to ophthalmic lenses having combined multifocal toric lens designs, and in particular to contact lenses, such as soft hydrogel contact lenses, and intraocular lenses, having more than one optical power or focal length, which are designed particularly for astigmatic presbyopes.

It is well known that as an individual ages, the eye is less able to accommodate, i.e. bend the natural lens in the eye, in order to focus on objects that are relatively near to the observer. This condition is referred to as presbyopia, and presbyopes have in the past relied upon spectacles or other lenses having a number of different regions with different optical powers to which the wearer can shift his vision in order to find the appropriate optical power for the object or objects upon which the observer wishes to focus.

Similarly, for a person who has had the natural lens of the eye removed because of a cataract condition and an intraocular lens inserted as a replacement, the ability to adjust the lens (accommodate) to the distance of the object being viewed is totally absent. In this case, the lens provided is usually set at a single infinite distance focal power, and spectacles are worn to provide the additional positive optical power needed for in-focus closer vision. For such a patient, a functional multifocal lens would be particularly useful.

It is also known in the art that under certain circumstances the brain can discriminate between separate competing images by accepting an in-focus image and rejecting an out-of-focus image.

Toric contact lenses have a cylindrical optical surface/power which is used to correct for astigmatism in a patient. Statistically, astigmatism occurs in people primarily around either the horizontal axis or the vertical axis of the eye, but could occur at any position. In the prior art a separate type of toric contact lens is required for each different toric optical power and also for each different orientation of the toric cylindrical axis of the contact lens, which are required to accommodate different patients with differing amounts of astigmatism along different axes.

Accordingly, inventories of toric contact lenses, or plastic molding parts for molding the toric contact lenses, include a number of different combinations of toric axis location and toric optical power.

U.S. Pat. No. 5,448,312, entitled PUPIL TUNED MULTIFOCAL OPHTHALMIC LENS, discloses a multifocal concentric ophthalmic lens for presbyopic patients constructed with three general annular lens portions in a multifocal design. A central circular portion of the lens has only the patient's distance corrective power, and is surrounded by a first inner annular portion, which can consist of multiple annular rings having an inner radial portion which enhances the patient's near focal power encircled by radial portions of variable cumulative amounts of distance and near optical power focal correction for the patient. This is surrounded by a second outer annular portion, which can also consist of one or more annular rings having additional distance focal power near the periphery of the optical surface area of the ophthalmic lens. Each annular ring has either a near or distance optical power and works in combination with other lens portions to yield the desired focal ratio in that portion of the lens.

SUMMARY OF THE INVENTION

Accordingly, it is a primary object of the present invention to provide combined multifocal toric lens designs which combine a correction for astigmatism, either corneal or lenticular, with a correction for presbyopia.

Several embodiments are disclosed pursuant to the teachings of the present invention in which:

One surface of the lens design contains a toric correction, while the other surface of the lens design provides a presbyopic correction, which may include concentric multifocal lens designs as described U.S. Pat. No. 5,448,312 and U.S. patent application Ser. No. 07/988,071 or other presbyopic lens designs which contain more than one spherical or aspherical power (such as aspheres, segments, progressive aspheres, diffractive, birefringent or other concentrics), and in general include, a front toric surface in combination with a back multifocal surface, or a front multifocal surface in combination with a back toric surface, or in the other embodiments, one surface of the lens design contains a combined concentric multifocal toric surface, and the other surface of the lens design contains a spherical or aspherical correction, and in general include, a back toric multifocal surface in combination with a front spherical surface, which is a preferred embodiment, or a back toric multifocal surface in combination with a front booster or aspheric surface, which is a second preferred embodiment, or a back spherical surface in combination with a front toric multifocal surface, or a back booster or aspheric surface in combination with a front toric multifocal surface.

All of the above embodiments may require positional stabilization involving ballast or slab-off features on either the front or back of the lens is known in the art, and accordingly these known features are not illustrated in the accompanying drawings.

In accordance with the teachings herein, the present invention provides a multifocus, concentric annular ring lens for astigmatic presbyopes wherein one of the front and back surfaces of the lens defines a toric surface for an astigmatic optical correction, and one of the front and back surfaces defines a multifocal surface for a presbyopic optical correction, to provide visual acuity for astigmatic presbyopes. In some embodiments, a single surface can incorporate both corrections and has a combined toric multifocal surface with a plurality of annular toric rings.

In greater detail, the toric surface can define a central area comprising a toric disc having a toric surface corresponding to a distance optical power. A plurality of annular toric rings surround the central area and comprise at least one annular toric ring having a near optical power and at least one annular toric ring having a distance optical power. The plurality of annular toric rings preferably comprise alternating near optical power toric rings and distance optical power toric rings, with the innermost annular toric ring having a near optical power and the next innermost annular toric ring having a distance optical power. Moreover, the widths of the individual annular toric rings can be varied to generate a power profile with different ratios of distance optical power to near optical power. The toric surface can comprise either a front or back surface of the lens, and the multifocal surface can also comprise either the same back or front surface or the opposite surface of the lens.

In several embodiments, the multifocal surface defines a central area comprising a spherical disc having a spherical surface corresponding to a distance optical power. A plurality of circular annular rings surround the central area and comprise at least one circular annular ring having a near optical power and at least one circular annular ring having a distance optical power. The plurality of annular rings preferably comprise alternating near optical power rings and distance optical power rings, with the innermost annular ring having a near optical power and the next innermost annular ring having a distance optical power. Moreover, the widths of the individual annular rings can be different to generate a power profile which varies to generate different ratios of distance optical power to near optical power. In these circular annular ring embodiments, the toric surface is the opposite surface (front versus back) to the multifocal surface. The lens can comprise a contact lens to be worn on the cornea of the eye, such as a soft hydrogel contact lens, or can be an intraocular lens.

BRIEF DESCRIPTION OF THE DRAWINGS

The foregoing objects and advantages of the present invention for combined multifocal toric lens designs may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 5 and 6 are respectively front and back plan views of a third embodiment of a combined multifocal toric contact lens pursuant to the present invention which has a front toric surface in combination with a back concentric annular ring multifocal surface.

DETAILED DESCRIPTION OF THE DRAWINGS

In a first general embodiment, one surface of the lens design contains a toric correction, while the other surface of the lens design provides a presbyopic correction, which may include concentric multifocal lens designs as described in U.S. Pat. No. 5,448,312 and U.S. patent application Ser. No. 07/988,071, or other presbyopic lens designs which contain more than one spherical or aspherical power (such as aspheres, segments, progressive aspheres, diffractive, birefringent or other concentrics), and in general include, a front toric surface in combination with a back multifocal surface, or a front multifocal surface in combination with a back toric surface.

In a second general embodiment, one surface of the lens design contains a combined concentric multifocal toric surface, and the other surface of the lens design contains a spherical or aspherical correction, and in general include, a back toric multifocal surface in combination with a front spherical surface, which is a preferred embodiment, or a back toric multifocal surface in combination with a front boost aspheric surface, which is a second preferred embodiment, or a back spherical surface in combination with a front toroidal multifocal surface, or a back aspherical surface in combination with a front toroidal multifocal surface.

Figure 1:
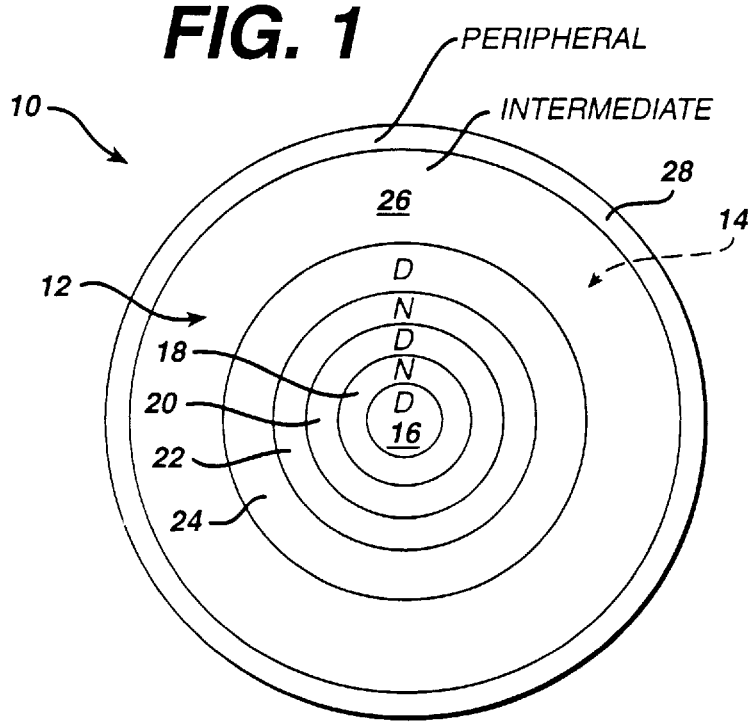
FIGS. 1 and 2 are respectively back plan and side views of a first embodiment of a combined multifocal toric contact lens design pursuant to the teachings of the present invention which has a back concentric annular ring toric multifocal surface in combination with a front spherical surface, which is a preferred embodiment, or with a front booster or aspheric surface, which is a second preferred embodiment.
Figure 2:
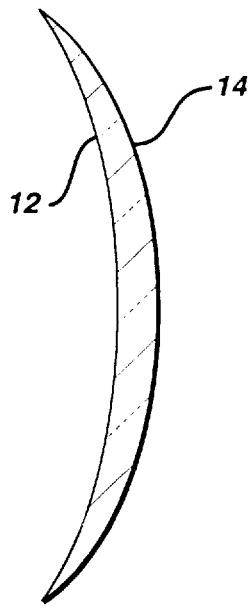

FIGS. 1 and 2 are respectively back plan and side views of a first embodiment of a combined multifocal toric contact lens 10 design pursuant to the teachings of the present invention which has a back concentric annular ring toric multifocal surface 12 in combination with a front spherical surface 14, which is a preferred embodiment, or with a front boost aspheric surface 14, which is a second preferred embodiment. The aspheric surface can be any selected aspheric surface adapted to perform a visual correction for the wearer.

The back toric surface 12 defines a central area comprising a toric disc 16 having a toric surface corresponding to a distance (labeled D) optical power. A plurality of annular toric rings 18, 20, 22, 24 surround the central area 16 and comprise annular toric rings 18 and 22 having a near (labeled N) optical power and annular toric rings 20 and 24 having a distance (labeled D) optical power. The plurality of annular toric rings preferably comprise alternating near optical power toric rings and distance optical power toric rings, with the innermost annular toric ring 18 having a near optical power and the next innermost annular toric ring 20 having a distance optical power. Moreover, the widths of the individual annular toric rings can be varied, as illustrated in FIG. 1, to generate a power profile with different ratios of distance optical power to near optical power.

In greater detail, in one exemplary designed embodiment the center toric disc 16 and the annular rings 20 and 24 have a distance radius of 8.4 mm, while annular rings 18 and 22 have a near radius of 8.694 mm to provide a cylinder optical power of −1.25D. The intermediate curve radius is 8.380 mm, and the peripheral curve radius is 9.82 mm, The center toric disc 16 has a horizontal width of 2.0 mm and a vertical height of 1.7828 mm, toric annular ring 18 has a horizontal width of 3.3 mm and a vertical height of 2.9279 mm, toric annular ring 20 has a horizontal width of 4.25 mm and a vertical height of 3.7968 mm, toric annular ring 22 has a horizontal width of 5.2 mm and a vertical height of 4.6265 mm, toric annular ring 24 has a horizontal width of 8.0 mm and a vertical height of 7.1745 mm.

The combined areas of the center toric disc 16 and the surrounding annular rings 18 through 24 comprise the active optical area of the lens, which is surrounded by a lenticular (nonoptical) area 26 which is beveled at its outer circumference at 28 to an outer circumferential edge of the lens. In the exemplary designed embodiment of FIGS. 1 and 2, the lenticular annular area 26 has a diameter of 13.0 mm to the start of beveled area 28, and the outer circumference of the lens has a diameter of 14.0 mm.

Figure 3:
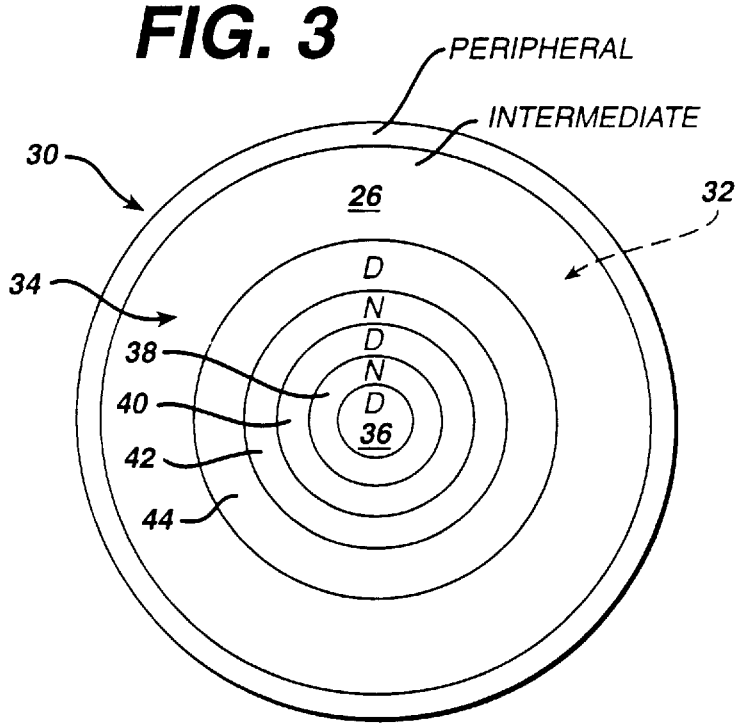
FIGS. 3 and 4 are respectively front plan and side views of a second embodiment of a combined multifocal toric contact lens pursuant to the present invention which has a back spherical surface or a back aspheric surface in combination with a front concentric annular ring toric multifocal surface.
Figure 4:
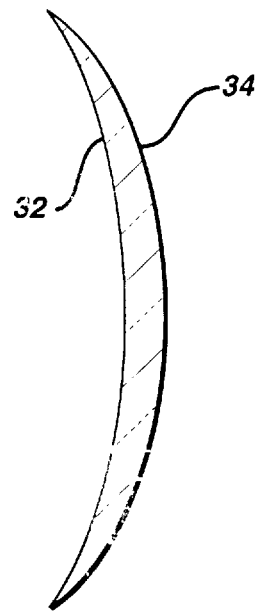

FIGS. 3 and 4 are respectively front plan and side views of a second embodiment of a combined multifocal toric contact lens 30 pursuant to the present invention which has a back spherical surface 32 or a back aspherical surface 32 in combination with a front concentric annular ring toric multifocal surface 34. The front toric surface 34 defines a central area comprising a toric disc 36 having a toric surface corresponding to a distance optical power. A plurality of annular toric rings 38, 40, 42, 44 surround the central area and comprise annular toric rings 38 and 42 having a near optical power and annular toric rings 40 and 44 having a distance optical power. Aside from a reversal of sides, toric surface 34 is substantially similar to toric surface 12 in the embodiment of FIGS. 1 and 2, and the comments, dimensions, optical powers, etc. given with respect to the embodiment of FIGS. 1 and 2 apply to the embodiment of FIGS. 3 and 4.

FIGS. 5 and 6 are respectively front and back plan views of a third embodiment of a combined multifocal toric contact lens 50 pursuant to the present invention which has a front toric surface 52 in combination with a back concentric annular ring multifocal surface 54. The front toric surface 52 comprises a large toric surface 56, having a horizontal axis in FIG. 5, which has an area covering substantially the same area as the concentric annular rings on the opposite side 54 of the lens. The cylindrical optical power and the orientation of the cylindrical axis are pursuant to the astigmatic prescription of the patient. The toric surface 56 is surrounded by a lenticular (nonoptical) area 58, which is beveled at 59 to an outer peripheral edge of the lens.

The multifocal back surface 54 defines a central area comprising a spherical disc 60 having a spherical surface corresponding to a distance optical power. A plurality of circular annular rings 62, 64, 66, 68, 70 and 72 surround the central area 60 and comprise circular annular rings 62, 66 and 70 having a near optical power and circular annular rings 64, 68 and 72 having a distance optical power. The plurality of annular rings preferably comprise alternating near optical power rings and distance optical power toric rings, with the innermost annular ring 62 having a near optical power. Moreover, the widths of the individual annular rings can be different, as illustrated in FIG. 6, to generate a power profile which varies to generate different ratios of distance optical power to near optical power. The optic region of the lens, which is encompassed by the outer diameter of annular ring 72, is surrounded by a lenticular (nonoptical) area 74 to the peripheral edge of the lens.

Figure 8:
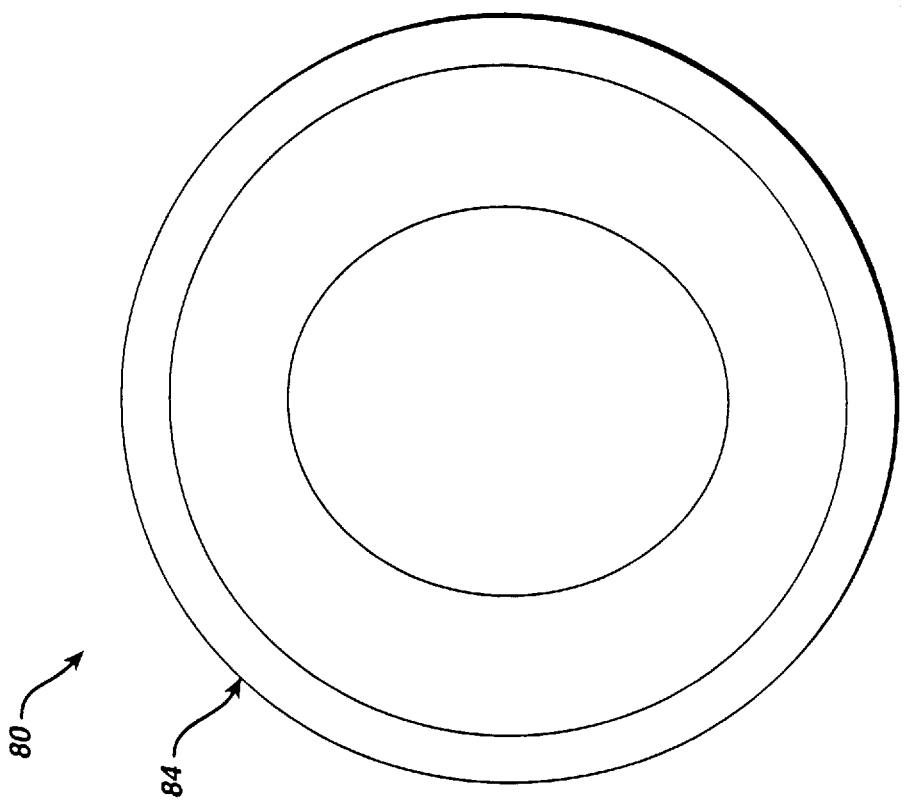
FIGS. 7 and 8 are respectively front and back plan views of a fourth embodiment of a combined multifocal toric contact lens pursuant to the present invention which has a front concentric annular ring multifocal surface in combination with a back toric surface.
Figure 7:
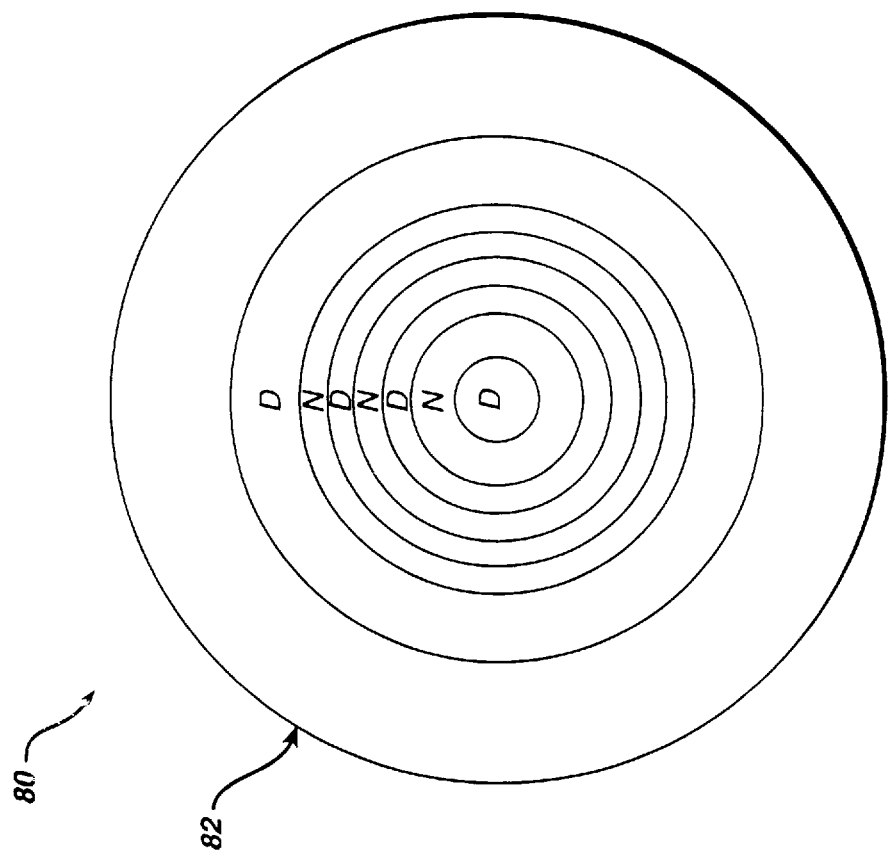

FIGS. 7 and 8 are respectively front and back plan views of a fourth embodiment of a combined multifocal toric contact lens 80 pursuant to the present invention which has a front concentric annular ring multifocal surface 82 in combination with a back toric surface 84. The embodiment of FIGS. 7 and 8 is substantially similar to the embodiment of FIGS. 5 and 6, with the multifocal surface now being the front surface of the lens, and the toric surface now being the back surface of the lens. However, the orientation of the cylindrical axis in FIG. 8 is now vertical rather than horizontal as in FIG. 6. Accordingly, the explanation and comments made with respect to the embodiment of FIGS. 5 and 6 apply equally with respect to the embodiment of FIGS. 7 and 8.

The lens can be a contact lens to be worn on the cornea of the eye, such as a soft hydrogel contact lens, or can be an intraocular lens. The central area and the plurality of annular rings are preferably formed on the rear surface of a contact lens to minimize flare and glare problems.

A person's pupil size is a function which is dependent upon light intensity, and is an important parameter in the design of ophthalmic lenses, particularly contact lenses and intraocular lenses.

Moreover, ocular in vivo image quality measurement devices can be used to optimize the ocular image quality in the concentric annular ring lens designs to produce even more improved designs. This is accomplished by using an in vivo image quality measurement device to measure and decrease the sum of the aberrations of a first design of a lens on the patient's eye to measure residual aberrations, and then redesigning the lens to reduce the measured residual aberrations and improve visual acuity and performance. The redesign of the lens can include aspherizing the surface opposite the surface defining the central area and the plurality of annular rings, or aspherizing the concentric annular ring surface. Moreover, an aberroscope or MTF point spread device is preferably utilized to measure the modulation transfer function of the combination of the lens and eye.

Obviously, many different embodiments of the present invention are possible, with alterations of the number of annular rings, the widths and arrangement of the annular rings, and the optical powers assigned to each of the annular rings.

While several embodiments and variations of the present invention for a combined multifocal toric lens designs are described in detail herein, it should be apparent that the disclosure and teachings of the present invention will suggest many alternative designs to those skilled in the art.

What is claimed is:

1. A multifocus, annular ring lens for astigmatic presbyopes comprising:
   a. a front surface and an opposite back surface, wherein one of the front and back surfaces defines a toric surface having multifocus annular toric rings for astigmatic optical correction and for presbyopic optical correction; and
   b. the other one of the front and back surfaces comprises a spherical or aspherical surface, whereby said lens provides visual acuity for astigmatic presbyopes.

2. A multifocus annular ring lens for astigmatic presbyopes as claimed in claim 1, wherein the toric surface defines a central area comprising a toric disc having a toric surface corresponding to a distance optical power, and a plurality of annular toric rings surround the central area and comprise at least one annular toric ring having a near optical power and at least one annular toric ring having a distance optical power.

3. A multifocus annular ring lens for astigmatic presbyopes as claimed in claim 2, wherein the plurality of annular toric rings comprise alternating near optical power toric rings and distance optical power toric rings.

4. A multifocus, annular ring lens for astigmatic presbyopes as claimed in claim 2, wherein the innermost annular toric ring has a near optical power and the next innermost annular toric ring has a distance optical power.

5. A multifocus, annular ring lens as claimed in claim 2, wherein the widths of individual annular toric rings are different to generate a power profile which varies to generate different ratios of distance optical power to near optical power.

6. A multifocus annular ring lens for astigmatic presbyopes as claimed in claim 1, wherein the toric surface having multifocus annular toric rings comprises a front surface of the lens.

7. A multifocus annular ring lens for astigmatic presbyopes as claimed in claim 1, wherein the toric surface having multifocus annular toric rings comprises a back surface of the lens.

8. A multifocus, annular ring lens as claimed in claim 1, wherein the lens comprises a contact lens to be worn on the cornea of the eye.

9. A multifocus, annular ring lens as claimed in claim 1, wherein the lens comprises a soft hydrogel contact lens.

10. A multifocus, annular ring lens as claimed in claim 1, wherein the lens comprises an intraocular lens.

11. A multifocus, annular ring lens as claimed in claim 6, wherein the back surface of said lens comprises a spherical surface.

12. A multifocus, annular ring lens as claimed in claim 6, wherein the the back surface of said lens comprises an aspherical surface.

13. A multifocus, annular ring lens as claimed in claim 7, wherein the front surface of said lens comprises a spherical surface.

14. A multifocus, annular ring lens as claimed in claim 7, wherein the front surface of said lens comprises an aspherical surface.

* * * * *